United States Patent
Hollmann et al.

(10) Patent No.: US 10,739,445 B2
(45) Date of Patent: Aug. 11, 2020

(54) PARALLEL PHOTON COUNTING

(71) Applicant: The Charles Stark Draper Laboratory, Inc., Cambridge, MA (US)

(72) Inventors: Joseph Hollmann, Watertown, MA (US); Zachary R. Hoffman, Boston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/415,748

(22) Filed: May 17, 2019

(65) Prior Publication Data

US 2019/0361098 A1   Nov. 28, 2019

Related U.S. Application Data

(60) Provisional application No. 62/675,281, filed on May 23, 2018.

(51) Int. Cl.
| | |
|---|---|
| *G01C 3/08* | (2006.01) |
| *G01S 7/4863* | (2020.01) |
| *G01S 7/481* | (2006.01) |
| *G01S 17/10* | (2020.01) |
| *G05D 1/02* | (2020.01) |

(52) U.S. Cl.
CPC .......... *G01S 7/4863* (2013.01); *G01S 7/4816* (2013.01); *G01S 17/10* (2013.01); *G05D 1/0231* (2013.01); *G05D 2201/0213* (2013.01)

(58) Field of Classification Search
CPC ...... G01S 7/4863; G01S 7/4816; G01S 17/10; G05D 1/0231; G05D 2201/0213
See application file for complete search history.

(56) References Cited

U.S. PATENT DOCUMENTS

| | | |
|---|---|---|
| 8,581,172 B2 | 11/2013 | Eldesouki et al. |
| 9,634,156 B2 | 4/2017 | Pavlov et al. |
| | (Continued) | |

FOREIGN PATENT DOCUMENTS

EP    0 805 359    11/1997

OTHER PUBLICATIONS

Hardesty, "Depth-sensing imaging system can peer through fog," MIT News, 3 pages, Mar. 20, 2018 http://news.mit.edu/2018/depth-sensing-imaging-system-can-peer-through-fog-0321.

(Continued)

*Primary Examiner* — Samantha K Abraham
(74) *Attorney, Agent, or Firm* — Sunstein LLP

(57) ABSTRACT

A method of lidar processing pulses a scene with laser pulse sequences from a laser light source. Reflected light from the target scene passes through receiver optics and is defocused to cover a light sensing surface of a photo detector array. The photo detector array contains multiple photon detector elements connected in parallel where each photon detector element is configured to generate corresponding photon pulse output signals based on sensing photons in the received reflected light, and each photon detector element is characterized by a non-responsive dead time period immediately after sensing a photon. The photon pulse output signals are combined to form a common real time output signal, which is converted to a digital time resolved histogram. Multiple digital time resolved histograms produced in response to multiple light pulses directed at a scanning location are combined to form a composite time resolved histogram for the scanning location.

20 Claims, 5 Drawing Sheets

(56) References Cited

U.S. PATENT DOCUMENTS

| | | | |
|---|---|---|---|
| 9,638,520 | B2 | 5/2017 | Eisele et al. |
| 2006/0170908 | A1* | 8/2006 | Glimm .................... G01C 1/02 356/148 |
| 2010/0141928 | A1* | 6/2010 | Embry ............... G01N 21/4133 356/5.01 |
| 2016/0086050 | A1 | 3/2016 | Piekniewski et al. |
| 2017/0052065 | A1* | 2/2017 | Sharma ................ G01S 7/4863 |
| 2017/0176579 | A1 | 6/2017 | Niclass et al. |
| 2017/0242443 | A1 | 8/2017 | Schuh et al. |
| 2018/0113200 | A1* | 4/2018 | Steinberg ................ G01S 7/497 |
| 2018/0136314 | A1 | 5/2018 | Taylor et al. |
| 2019/0018416 | A1* | 1/2019 | Gassend ............. G05D 1/0094 |
| 2019/0056497 | A1 | 2/2019 | Pacala et al. |

OTHER PUBLICATIONS

Carter, et al., "Lidar 101: An Introduction to Lidar Technology, Data, and Applications," National Oceanic and Atmospheric Administration (NOAA) Coastal Services Center, 76 pages, Nov. 1, 2012.

Takagi, et al., "Road Environment Recognition Using On-Vehicle LIDAR," IEEE Intelligent Vehicles Symposium, 9 pages, Jan. 1, 2006.

Hata, et al., "Feature Detection for Vehicle Localization in Urban Environments Using a Multilayer LIDAR," Journal of Latex Class Files, vol. 11, No. 4, Dec. 1, 2012.

Agishev, et al., "Lidar with SiPM: Some capabilities and limitations in real environment," Optics & Laser Technology, vol. 49, pp. 86-90, Jan. 23, 2013.

Edgar, et al., "Real-time computational photon-counting LiDAR," Optical Engineering vol. 57(3), pp. 031304-1-031304-7, Dec. 29, 2017.

Niclass, et al., "A 0.18-μm CMOS SoC for a 100-m-Range 10-Frame/s 200 × 96-Pixel Time-of-Flight Depth Sensor," IEEE Journal of Solid-State Circuits, vol. 49, No. 1, pp. 315-330, Jan. 1, 2014.

European Patent Office as the International Searching Authority, Authorized Officer: Francesca Reginelli, International Search Report and Written Opinion of the International Searching Authority, PCT/US19/32920, dated Sep. 17, 2019, 16 pages.

* cited by examiner

PARALLEL PHOTON COUNTING

CROSS-REFERENCE TO RELATED APPLICATIONS

This patent application claims the benefit of U.S. Provisional Patent Application No. 62/675,281, filed May 23, 2018. The disclosures of this application are incorporated by reference herein in their entirety.

TECHNICAL FIELD

The present invention relates to relates to range detection systems, and more particularly to light detection and ranging (lidar) systems.

BACKGROUND ART

The demand for lidar imaging solutions has increased with the advent of autonomous vehicles and drones. Lidar uses a pulsed laser beam to probe the distance to a reflector by measuring the time it takes for the light to be reflected back to the device. This allows for very precise measurements of a given environment. However, the small wavelength of light means that rain drops, fog, smoke, sand, and other scatterers can obscure the signal. These scatterers act to reflect light back to the lidar sensor and result in false distance measurements. Some work has been done with time-gating the lidar signal to remove returns from nearby scatterers but the benefits have been limited.

For sensitive lidar devices, the optical detector can be a single-photon avalanche diode (SPAD) configured for operating in Gieger mode. These detectors are ideal for sensitive detectors because they provide a relatively large signal every time they detect a photon. However, due to the avalanche process, these detectors can only detect a single photon at a time. Every time these detectors receive a photon, the detector is 'blind' to other photons for a certain amount of time often referred to as 'dead time'. In the presence of obscurants, this dead time can effectively blind the detector to photons arriving from the target. For example, backscatter from fog produces the first detected photons obscuring any targets in the scene. This problem can be addressed in part by pulsing the laser multiple times while only detecting a photon from each pulse. When this is performed enough times, eventually a histogram can be constructed of photons arriving at all times of interest. If the fog isn't too bad, returning photons from a target may eventually be detectable over the random backscatter. This serial acquisition takes a relatively large amount of time, which may fail to achieve real time identification of targets in the scene.

SUMMARY

Embodiments of the present invention are directed to lidar processing that pulses a scene with light pulse sequences from a light source. Reflected light from the target scene passes through receiver optics and is defocused to cover a light sensing surface of a photo detector array. The photo detector array contains multiple photon detector elements connected in parallel, where each photon detector element is configured to generate corresponding photon pulse output signals based on sensing photons in the received reflected light, and each photon detector element is characterized by a non-responsive dead time period immediately after sensing a photon. Outputs of the photon detector elements are combined to form a common real time output signal, which is fed into an analog-to-digital converter. A time resolved histogram is generated from the photon pulse output signals received in response to a series of light pulses at each scanned location to characterize the physical features of the scene.

Defocusing may be performed by receiver optics including a lens having a focal plane positioned beyond the light sensing surface of the photo detector array. Alternatively, the receiver optics may include a collimating lens to collimate defocused light onto the light sensing surface of the photo detector array.

A lidar processor including at least one hardware processor has access to the time resolved histograms produced by the analog-to-digital converter. The processor is configured to combine a plurality of the time resolved histograms for one scanning location into a composite time resolved histogram for the one scanning location. The composite time resolved histogram for the one scanning location is used to determine distance to the scanning location.

In further specific embodiments, the photon detector elements may be single-photon avalanche diodes (SPADs) configured to operate in Geiger mode. For example, the SPADs may be arranged as a SPAD camera or an array of SPADs forming a silicon photomultiplier with a common output. The scene may be characterized by multiple scanning locations and each scanning location is scanned by a laser pulse sequence. And an autonomous vehicle may be operated based on the one or more objects and their respective distances.

DETAILED DESCRIPTION

Figure 1:
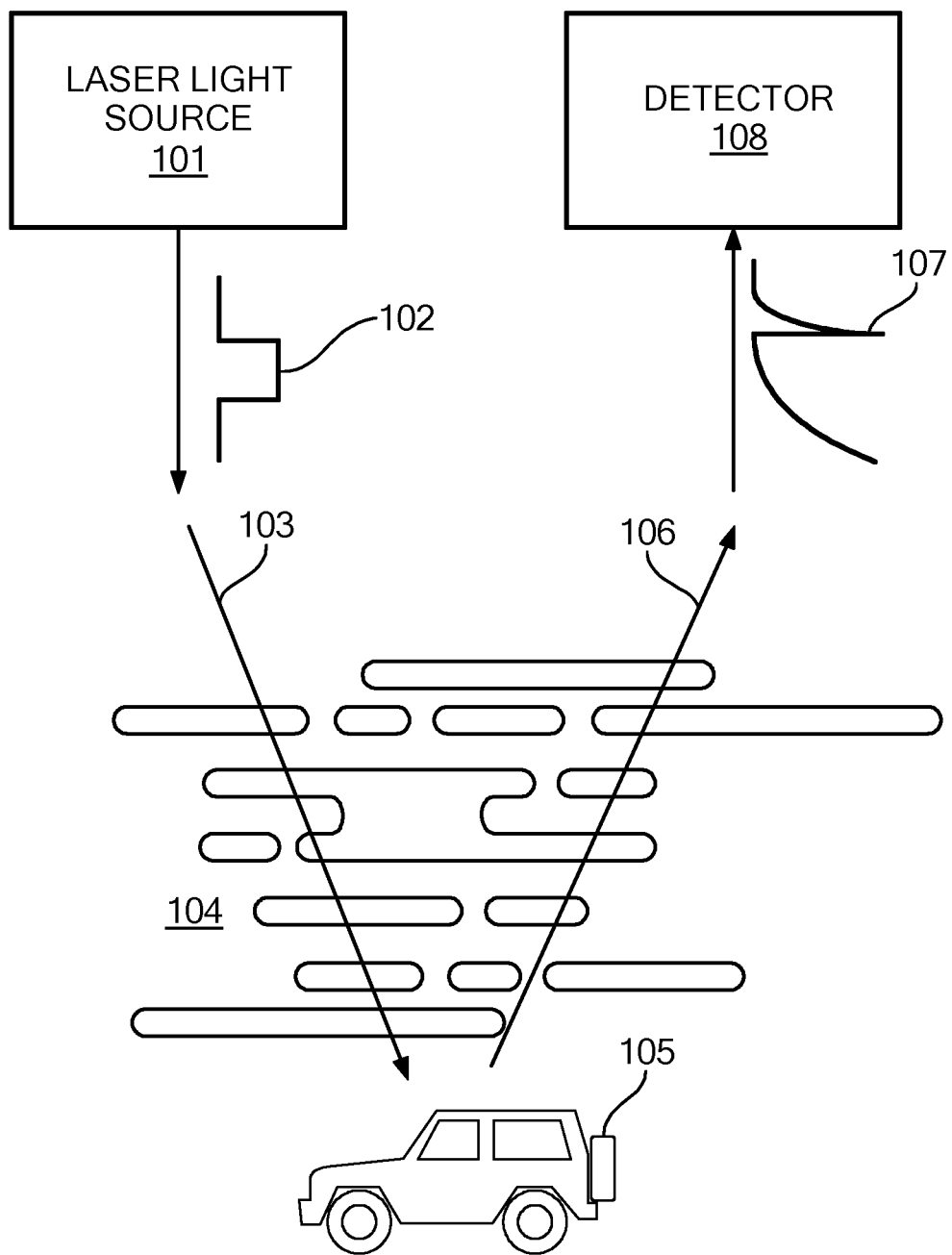
FIG. 1 shows a typical environment for embodiments of the present invention.

Embodiments of the present invention are directed to a lidar processing system and method. FIG. 1 shows a typical environment for lidar imaging according to an embodiment of the present invention. A lidar system has a lidar processor (not shown) including at least one hardware implemented processor device which is controlled by software instructions to perform the lidar processing. This includes instructing a laser light source 101 to pulse a scene with a sequence of laser pulses 102. The laser pulses 102 travel along a transmission path 103 to the scene, striking the various objects 105 located there. Some portion of the light in the laser pulses 102 reflects off the objects 105 and travels as reflected light 107 along a reflection path 106 and is measured by a receiver detector 108.

Ideally the transmission path 103 and the reflection path 106 would be clear dry air, but in the real world there often is fog 104 and/or rain drops, smoke, sand, and other optical scatterers that can obscure the reflected light signal. The receiver detector 108 converts the received reflected light 107 into a time-resolved signal for each of the laser pulses. This is repeated N times for each scanning position of the scene by the laser light source 101. From the time resolved reflected light signals, the controller processor determines distance to an object at each scanning location, which can be used, for example, to operate an autonomous vehicle. The object is identified by a peak in the photons detected at a particular return time.

Figure 2A:
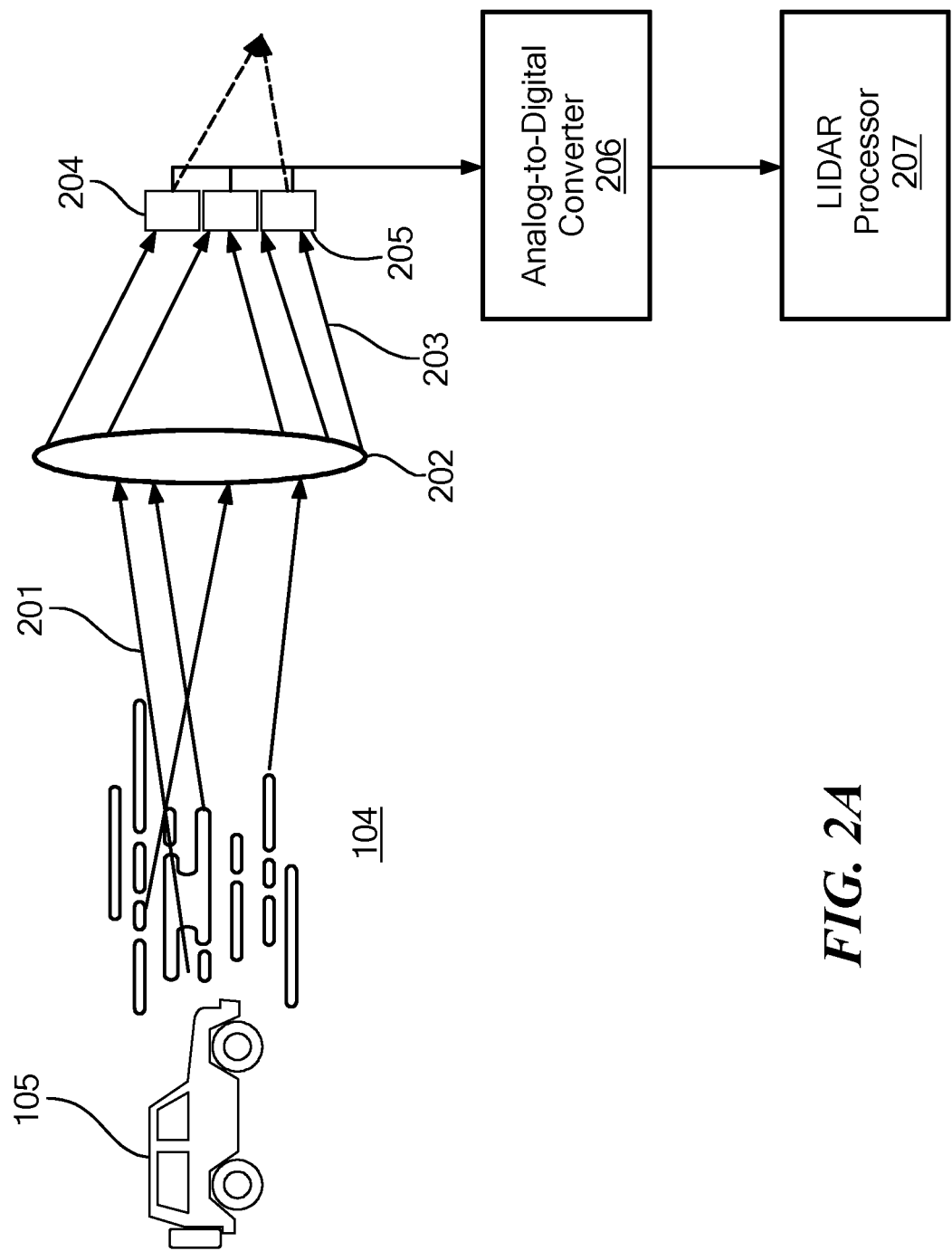
FIG. 2A is a schematic of a lidar system of an embodiment of the present invention.
Figure 2B:
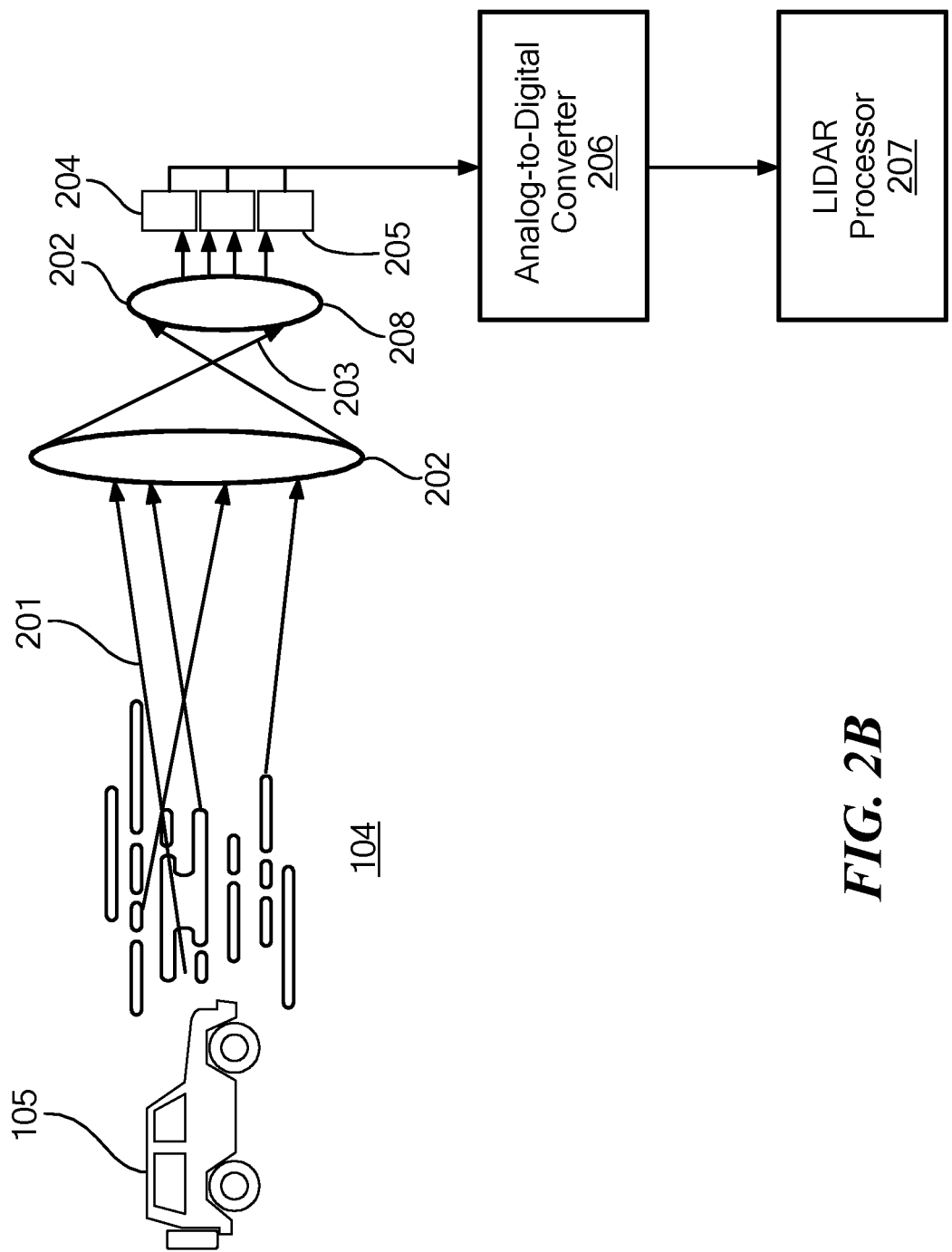
FIG. 2B is a schematic of a lidar system of an alternate embodiment of the present invention.

Embodiments of the present invention are based on improved arrangements of receiver optics and photon detection elements as shown in FIGS. 2A and 2B. Reflected light 201 from the target scene 105 pass through receiver optics 202 and are sensed at a light sensing surface 205 of a two dimensional array of photo detectors 204. The receiver optics are configured to defocus the reflected light 201 upon the light sensing surface 205. The defocused light 203 is intended to spread the optical power of the incoming light over many of the individual photo detectors. Ideally, the light uniformly covers a field of view on the light sensing surface 205. In the embodiment of FIG. 2A, the receiver optics 202 is a lens having a focal plane positioned beyond the light sensing surface 205 so that defocused light hits and covers the light sensing surface. In the embodiment of FIG. 2B, the receiver optics 202 includes a series of lenses, including a collimating lens 208, which collimates the defocused light so as to hit and cover the light sensing surface 205.

Figure 2C:
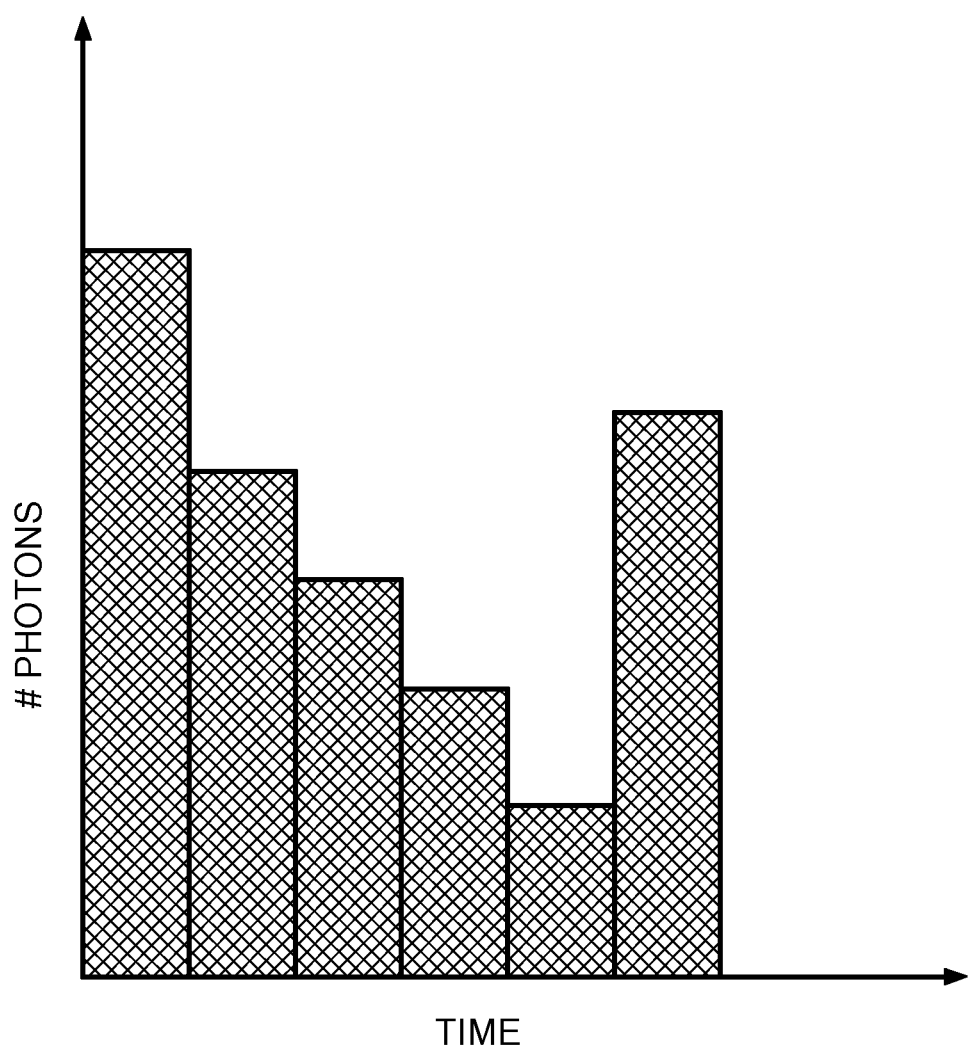
FIG. 2C shows a time resolved histogram output from the analog-to-digital converter of FIG. 2A or 2B.

The photo detector array 204 contains multiple photon detector elements connected in parallel. Each photon detector element in the photo detector array 204 is configured to generate corresponding photon pulse output signals based on sensing individual photons in the defocused light 203, and each photon detector element is characterized by a non-responsive dead time period immediately after sensing a photon. In specific embodiments, the photo detector elements may specifically be an array of SPAD detectors such as a SPAD camera or silicon photomultiplier (an array of SPAD's with a common output). The outputs from the detectors are combined to produce a common real time output signal formed by the photon detections. A high speed analog-to-digital converter 206 converts the signal to a digital indication of a number of photons received in each time bin. Preferably, the analog-to-digital converter 206 samples at a rate comparable to the time width of a light pulse. In other words, the width of each time bin of the output from the converter is within an order of magnitude of the time width of a light pulse. In some embodiments, the analog-to-digital converter operates at 2 GHz. The reception time bins are typically within the time interval between one light pulse and the next light pulse. The number of photons per time bin produced by the analog-to-digital converter 206 constitutes a digital time resolved histogram as illustrated in FIG. 2C.

Because the photo detector elements are connected in parallel, the number of photon pulses needed to build a time resolved histogram (FIG. 2C) is decreased by the number of elements in the photo detector array 204. This can enable an improvement of three orders of magnitude or more in acquisition speed. To improve the signal to noise ratio and suppress backscatter effects from fog or other random interference, a number of light pulses are repeated to each individual scanning location. The number of repetitions might be as small as ten, depending on the application. Therefore, in real time, a lidar processor 207 can combine the digital time resolved histograms for the scanning location into a composite time resolved histogram for the location. The individual digital time resolved histograms can be simply superimposed on one another. The intensity at each time bin can be calculated, for example, by adding the counts for that time bin in the histograms being combined and/or by averaging the counts. Since random reflections from fog or the like are likely received in differing time bins from one pulse to another and reflections from an object 105 should be received at a repeatable time bin determined by the object's distance, the reflections from the object are reinforced in the composite time resolved histogram for the location. Thus, the peak created by the object is identifiable by the lidar processor 207, which can then determine in real time the distance to the object from the indicated time of flight found in the composite time resolved histogram.

Figure 3:
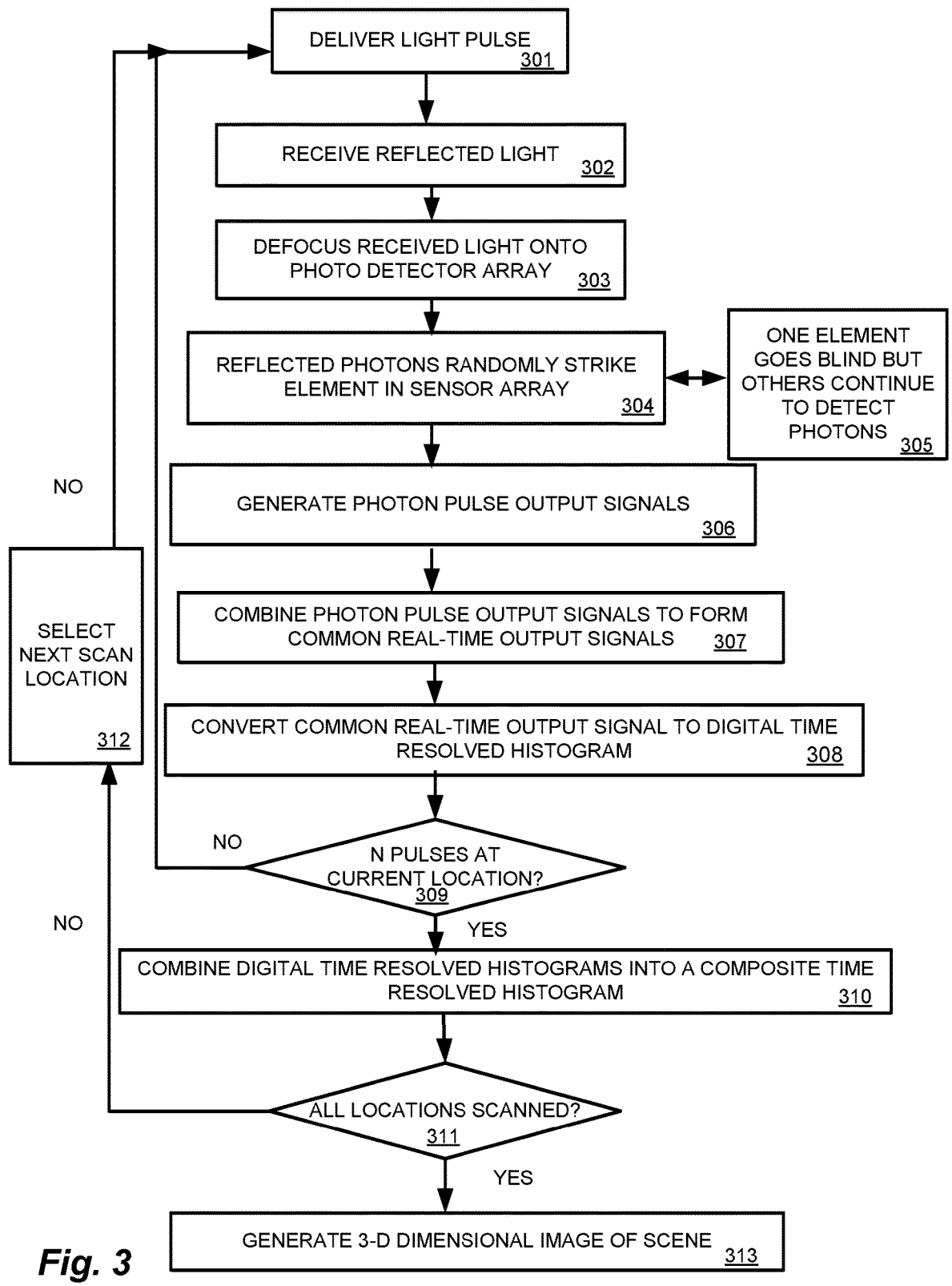
FIG. 3 shows various logical steps in a method of lidar imaging according to an embodiment of the present invention.

The process as shown in FIG. 3, starts by operating a light source, such as laser light source 101 to transmit a light pulse 102 to a scanning location, step 301. Receiver optics are oriented so as to receive light reflected from the scanning location, step 302. The receiver optics defocuses the received light to hit and cover the light sensing of the photo detector array, step 303. Photons in the received reflected light are directed across the light sensing surface by the receiver optics and so randomly strike a photo detector element in the array, step 304. During the dead time period immediately after sensing a photon, that specific photo detector element is unresponsive ("blind"), but the other photo detector elements in the sensor array continue to sense photons, step 305. This generates photon pulse output signals in real time, step 306, during the receive time following each laser pulse.

The real time photon pulse output signals are combined to form a common real-time output signal, step 307. Combining may take place, for example, in a SiPM, serving as the photo detector array. The common real-time output signal is fed through an analog-to-digital converter, where it is converted to a digital time resolved histogram, step 308. The analog-to-digital converter operates at a high speed sampling rate to provide a distance measurement for an identified object with high precision.

In order to improve the signal-to-noise ratio, steps 301-308 are repeated in a loop until some number N pulses have been delivered to a given scanning location, step 309. The time interval between pulses may be set depending on the maximum distance in the scene being interrogated. Pulses may be more frequent for a near field interrogation. The digital time resolved histograms for the given scanning location are combined to form a composite time resolved histogram 310. The histograms are superimposed and the light intensities summed or averaged at each time bin thereby enhancing reflected photon pulse output signals from an object and minimizing light signals reflected from random interference, like fog.

If scanning has not been completed for each scanning location, step 311, then the next scanning location is selected, step 312, and the process of steps 301-311 is repeated until the entire scene has been scanned. The composite time resolved histogram for each scanning location is used to determine a distance to an object at the scanning location. A peak intensity in the histogram corresponding to the object can be identified. Effects of fog or other random interference along the histogram can be further filtered, if needed. Distance to an object is directly determined from the time of flight indicated by the return time indicated for the peak return signal. The distances may be all that is required by certain applications. In other applications, it may be desirable to characterize the physical features of the scene. For example, a three-dimensional image of the scanned scene may be reproduced from the lidar system results, step 313. According to embodiments of the invention, the three-dimensional image of the scene can be mapped in real time, in other words, completing the mapping before the next scan of the scene is done being collected. The image may be presented on a display screen.

Embodiments of the invention may be implemented in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be a tangible medium (e.g., optical or analog communications lines) and the series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A lidar receiver system comprising:
a photo detector array containing a plurality of photon detector elements connected in parallel and arranged in an area defining a light sensing surface, wherein each photon detector element is configured to generate a real time photon pulse output signal in response to sensing a photon, and wherein each photon detector element is characterized by a non-responsive dead time period immediately after sensing a photon, and wherein the real time photon pulse output signals from the plurality of photon detector elements are combined to form a common real time output signal;
receiver optics configured to defocus received light onto the light sensing surface of the photo detector array; and
an analog-to-digital converter connected to receive the common real time output signal and produce a time resolved histogram.

2. The system according to claim 1, wherein the photon detector elements comprise single-photon avalanche diodes (SPADs) configured to operate in Geiger mode.

3. The system according to claim 2, wherein the SPADs are arranged as a SPAD camera.

4. The system according to claim 2, wherein the SPADs are arranged as an array of SPADs forming a silicon photomultiplier with a common output.

5. The system according to claim 1, wherein the receiver optics comprises a lens having a focal plane and wherein the focal plane is beyond the light sensing surface of the photo detector array.

6. The system according to claim 1, wherein the receiver optics comprises a collimating lens configured to collimate defocused light onto the light sensing surface of the photo detector array.

7. The system according to claim 1, wherein the analog-to-digital converter produces time resolved histograms with time bins having a time width within an order of magnitude of a time width of one of the light pulses.

8. The system according to claim 1, further comprising a lidar processor including at least one hardware processor having access to the time resolved histograms produced by the analog-to-digital converter and configured to combine a plurality of the time resolved histograms for one scanning location into a composite time resolved histogram for the one scanning location.

9. The system according to claim 8, wherein the lidar processor further determines a distance for the one scanning location based upon the composite time resolved histogram.

10. A computer-implemented system for lidar processing, the system comprising:
a light source configured for generating a light pulse sequence;
transmitter optics configured for transmitting the light pulse sequence from the light source to a scanning location in a scene;
a photo detector array containing a plurality of photon detector elements connected in parallel and arranged in an area defining a light sensing surface, wherein each photon detector element is configured to generate a photon pulse output signal in response to sensing a photon, and wherein each photon detector element is characterized by a non-responsive dead time period immediately after sensing a photon;
receiver optics configured for receiving reflected light from the target location and for defocusing received light to cover the light sensing surface of the photo detector array;
data storage memory configured for storing lidar processing software and the photon pulse output signals; and
a lidar processor including at least one hardware processor coupled to the data storage memory and configured to execute the lidar processing software including instructions to generate a time resolved histogram for the scanning location from combining the photon pulse output signals obtained in response to the light pulse sequence.

11. The system according to claim 10, wherein the photon detector elements comprise a silicon photomultiplier with a common output.

12. The system according to claim 10, wherein the scene is characterized by a plurality of scanning locations and each scanning location is scanned by a light pulse sequence and wherein the lidar processor is configured to generate a time resolved histogram for each of the scanning locations to characterize physical features of the scene and for operating an autonomous vehicle based on the characterization of the physical features of the scene by the time resolved histograms.

13. The system according to claim 10, further comprising an analog-to-digital converter coupled between the photo detector array and the lidar processor.

14. The system according to claim 13, wherein the lidar processor generates the time resolved histogram for the scanning location by combining time resolved histograms obtained in response to each pulse in the light pulse sequence.

15. A lidar method comprising:
  (a) transmitting a light pulse sequence from a light source via transmitter optics to a scanning location in a target scene;
  (b) receiving reflected light from the target scene;
  (c) defocusing the received light to cover a light sensing surface defined by a photo detector array containing a plurality of photon detector elements connected in parallel;
  (d) generating, in any of the photon detector elements, a real time photon pulse output signal in response to sensing a photon, wherein each photon detector element is characterized by a non-responsive dead time period immediately after sensing a photon;
  (e) combining the real time photon pulse output signals from the photo detector array to form a common real time output signal; and
  (f) converting the common real time output signal into a digital time resolved histogram.

16. The method according to claim 15, wherein the defocusing the received light comprises configuring a lens with its focal plane beyond the light sensing surface of the photo detector array.

17. The method according to claim 15, wherein the defocusing the received light comprises collimating defocused light onto the light sensing surface of the photo detector array.

18. The method according to claim 15, further comprising combining a plurality of the digital time resolved histograms for one scanning location into a composite time resolved histogram for the one scanning location.

19. The method according to claim 18, further comprising determining a distance for the one scanning location based upon the composite time resolved histogram.

20. The method according to claim 15, further comprising repeating steps (a)-(f) for each of a plurality of scanning locations to characterize physical features of the scene and for operating an autonomous vehicle based on the characterization of the physical features of the scene by the time resolved histograms.

* * * * *